(12) United States Patent
Patel et al.

(10) Patent No.: US 9,218,736 B2
(45) Date of Patent: Dec. 22, 2015

(54) SENSOR NODES, APPARATUSES, AND METHODS FOR WIRELESSLY TRANSMITTING DATA TO A POWER INFRASTRUCTURE

(71) Applicant: University of Washington through its Center for Commercialization, Seattle, WA (US)

(72) Inventors: Shwetak N. Patel, Seattle, WA (US); Gabriel A. Cohn, Sammamish, WA (US); Matthew S. Reynolds, Durham, NC (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 71 days.

(21) Appl. No.: 14/024,388

(22) Filed: Sep. 11, 2013

(65) Prior Publication Data

US 2014/0070940 A1    Mar. 13, 2014

Related U.S. Application Data

(60) Provisional application No. 61/699,631, filed on Sep. 11, 2012, provisional application No. 61/699,618, filed on Sep. 11, 2012.

(51) Int. Cl.
*G08B 29/00* (2006.01)
*G08B 29/02* (2006.01)
(Continued)

(52) U.S. Cl.
CPC ............... *G08B 29/02* (2013.01); *G08B 25/06* (2013.01); *H04B 3/542* (2013.01); *H04B 2203/5408* (2013.01); *H04B 2203/5441* (2013.01); *H04B 2203/5445* (2013.01)

(58) Field of Classification Search
CPC .................. G08B 25/06; G08B 29/02; H04B 2203/5408; H04B 2203/5441; H04B 2203/5445; H04B 3/542
USPC ......... 340/506, 501, 517, 521–522, 541, 552, 340/565, 568.2, 539.19, 539.21, 539.26, 340/539.22
See application file for complete search history.

(56) References Cited

U.S. PATENT DOCUMENTS 5,285,137 A * 2/1994 Midas et al. .................. 318/280
5,894,095 A * 4/1999 DeMali ...................... 73/862.27
(Continued)

OTHER PUBLICATIONS

Int'l Search Report and Written Opinion for PCT/US2013/059225 dated Dec. 24, 2013.
(Continued)

*Primary Examiner* — Daniel Previl
(74) *Attorney, Agent, or Firm* — Dorsey & Whitney LLP

(57) ABSTRACT

Apparatuses, sensor nodes, systems and methods for modulating and transmitting sensor data wirelessly to an existing power line network are described. An apparatus may include a microcontroller having an oscillator and an input/output buffer. The microcontroller may process an electrical signal and the input/output buffer may drive a digital signal. The apparatus may include a transmitter utilizing the oscillator and the input/output buffer of the microcontroller. The transmitter may include a resonator coupled to the oscillator and modulation circuitry coupled to the oscillator and resonator. The resonator may modulate a frequency of the oscillator responsive to a modulation signal based on the processed electrical signal. The transmitter may further include an antenna coupled to the input/output buffer of the microcontroller for transmission of the data, and a resonant tank coupled to an output of the input/output buffer to provide an analog signal to the antenna.

25 Claims, 7 Drawing Sheets

(51) Int. Cl.
*H04B 3/54* (2006.01)
*G08B 25/06* (2006.01)

(56) References Cited

U.S. PATENT DOCUMENTS

| | | | |
|---|---|---|---|
| 7,508,898 B2 * | 3/2009 | Cyr et al. | 375/376 |
| 8,788,191 B1 | 7/2014 | Stuntebeck et al. | |
| 2006/0114983 A1 * | 6/2006 | Fink et al. | 375/239 |
| 2008/0190639 A1 * | 8/2008 | Baran et al. | 174/50 |
| 2009/0257529 A1 | 10/2009 | Popplewell et al. | |
| 2009/0322261 A1 * | 12/2009 | Araki | 318/116 |
| 2011/0057829 A1 * | 3/2011 | Yuanzhu | 342/28 |
| 2012/0154197 A1 * | 6/2012 | Djang et al. | 342/13 |
| 2012/0157021 A1 | 6/2012 | Moon et al. | |

OTHER PUBLICATIONS

Cohn, et al., "SNUPI: Sensor Nodes Utilizing Powerline Infrastructure", Ubicomp '10 Proceedings of the 12th ACM International Conference on Ubiquitous Computing, 2010, pp. 59-168.

French, Catherine A., "Distance Preserving Run-Length Limited Codes", IEEE Transactions on Magnetics, vol. 25, No. 5, Sep. 1989, pp. 4093-4095.

French, Catherine A. et al., "Performance Comparison of Combined ECC/RLL Codes", IEEE International Conference on Communications ICC '90 Including Supercomm Technical Sessions. SUPERCOMM ICC '90 Conference Record, vol. 4, Apr. 1990, pp. 1717-1722.

Immink, "Runlength-Limited Sequences", Proceedings of the IEEE, vol. 78, No. 11, Nov. 1990, pp. 1745-1759.

Lin, et al., "Combined ECC/RLL Codes", IEEE Transactions on Magnets, vol. 24, No. 6, Nov. 1988, pp. 2527-2529.

* cited by examiner

SENSOR NODES, APPARATUSES, AND METHODS FOR WIRELESSLY TRANSMITTING DATA TO A POWER INFRASTRUCTURE

CROSS REFERENCE TO RELATED APPLICATIONS

This application claims the benefit of the earlier filing date of U.S. Provisional Application No. 61/699,618 and U.S. Provisional Application No. 61/699,631, both filed on Sep. 11, 2012, which are incorporated herein by reference in their entirety and for any purpose.

TECHNICAL FIELD

Examples described herein are directed generally to wireless data transmission. In particular, examples are described that transmit data wirelessly using components of a microcontroller as a transmitter.

BACKGROUND

There have been many attempts to achieve building-wide sensing and monitoring of environmental conditions such as heat, humidity, light, and other measurable conditions. Despite rapid advances in computing power and technology, there has not been a successful product that enables a home owner or building manager to monitor various conditions within a building outside of such devices as thermostats. Many conventional sensing systems are too expensive or require too much expertise or supervision to reach widespread appeal. For example, among the many barriers to this type of system is the battery life of sensors. It is impractical for many consumers to replace dozens of batteries even as infrequently as once every one or two years. Accordingly, most homeowners and building managers do not employ any sort of building-wide sensor system and, accordingly, are often unaware of many potentially dangerous conditions in their homes or buildings. Humidity, vapor presence, unnecessary light usage, and rodent and insect infestations are all examples of expensive and potentially dangerous conditions that may be detected with a proper sensing mechanism. In many instances, however, such conditions are not monitored because of the above-mentioned constraints and shortcomings of conventional sensing systems.

DETAILED DESCRIPTION

Figure 1:
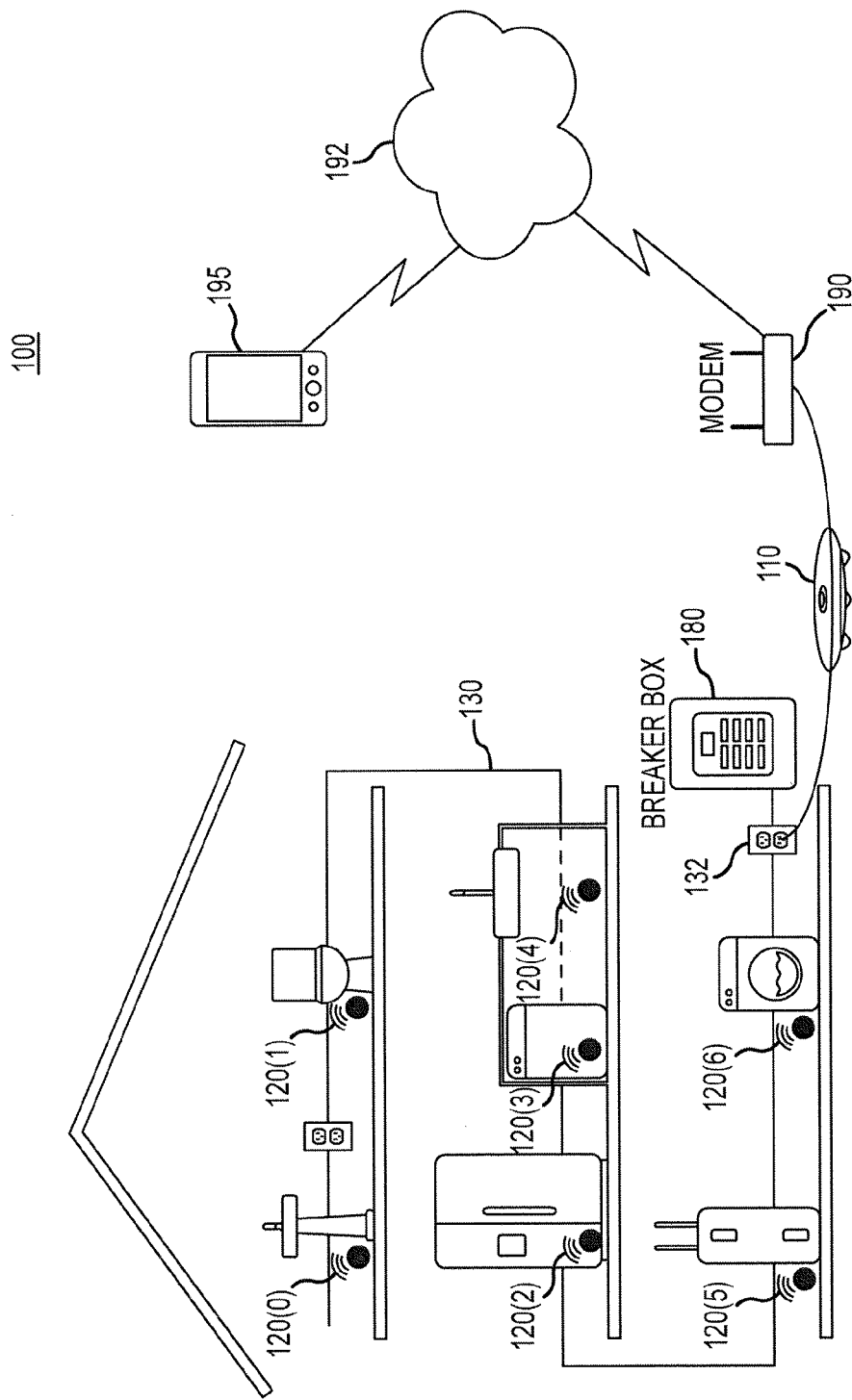
FIG. 1 is a block diagram of a sensing system including sensing nodes and a base station according to an embodiment of the disclosure.

Certain specific details are set forth in the following description and in FIGS. 1-7 to provide a thorough understanding of various embodiments of the technology. Other details including well-known structures and systems often associated with sensors, transmitters, receivers, and power line systems have not been set forth in the following disclosure to avoid unnecessarily obscuring the description of the various embodiments of the technology. Many of the details, dimensions, angles, and other features shown in the figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-7.

Examples described herein include sensor systems utilizing power infrastructures and associated systems and methods. In several embodiments, for example, a system may include a base station that is operably connected to a preexisting power line installation of a building or other structure, and a plurality of sensor nodes. The sensor nodes can include a sensor and a microcontroller. The sensor nodes can be configured to wirelessly transmit information gathered by the sensor to the base station using the preexisting power line installation as a receiving antenna. Electrical signals can be wirelessly delivered to the preexisting power line installation, which carries the signals to the base station, where the information is parsed and delivered to a user in a format that enables the user to respond properly to the monitored condition.

The preexisting power line installation may include the electrical wiring installed in the walls, floor, and/or ceiling of a building. In some embodiments, no change to the preexisting power line installation may be required to carry a signal from the sensor nodes, or to plug the base station into an electrical outlet in the building and receive information from the sensor nodes. In some embodiments, the sensor nodes are small, self-contained units (e.g., approximately one inch square and approximately one-half inch thick) that can be placed virtually anywhere in the building. The sensor nodes can be configured to detect various conditions within the building, such as light, moisture, sound, vibration, movement, temperature, static electricity, gas (e.g., carbon monoxide), radiation, or virtually any other measurable environmental condition. In some embodiments, some sensor nodes are created specifically to detect a certain environmental condition. In other embodiments, the sensor nodes are general purpose sensors and are equipped to detect two or more environmental conditions simultaneously or individually as needed.

Examples described herein include sensor nodes including a sensor that senses an environmental condition at the sensor node and a microcontroller coupled to an antenna that is configured to wirelessly transmit data corresponding to the environmental condition. The data may be transmitted to a receiving antenna using a long-range, near-field transmission. The receiving antenna can be a preexisting electrically conductive structure of a building (e.g. a powerline infrastructure).

Examples of methods for transmitting information associated with environmental conditions of a house, a building, or any other structure are also described. An example method may include sensing an environmental condition with a sensor at a sensor node and transmitting information representing the environmental condition wirelessly to a preexisting electrical power line installation connected to a base station. In some embodiments, the base station and sensor nodes can communicate wirelessly and bidirectionally. The sensor node may be configured to operate using very little power. In some embodiments, for example, the sensor node may operate between 4 mW and 100 mW while transmitting, and as little as approximately 2 µW while not transmitting.

FIG. 1 is an illustrative example of a sensing system 100 deployed in a sample building 104 having a preexisting power line 130 installed therein in accordance with an embodiment of the present disclosure. Several sensor nodes 120(0-6) can be positioned as desired throughout the building 104 and can be deployed to detect various environmental conditions. One or more base stations 110 can be deployed around the building 104 to gather data from the sensor nodes 120(0-6). In some embodiments, for example, the base station(s) 110 can be positioned centrally in the building 104 to reduce the overall distance between any given sensor node 120(0-6) and the nearest base station 110. In other embodiments, however, the base station(s) 110 may have a different arrangement relative to the sensor nodes 120(0-6) and/or building 104.

The dimensions of the building 104 and the power line 130 installation can govern the placement of the sensor nodes 120(0-6) and the base station(s) 110 in some examples. For example, a small, square building may have a single, centrally located base station, whereas a floor plan with a more complex shape may have two or more base stations to communicate effectively with the distributed sensor nodes 120(0-6). The base station(s) 110 can draw power from the electrical outlet 132 and can accordingly power a larger transmission mechanism that can transmit data to a computer over Bluetooth, Wi-Fi, or other suitable wireless data communication means. In some embodiments, the base station(s) 110 can include sufficient computing power to process the data and may issue an alert if one of the sensor nodes 120(0-6) reports a condition that requires attention.

Figure 2:
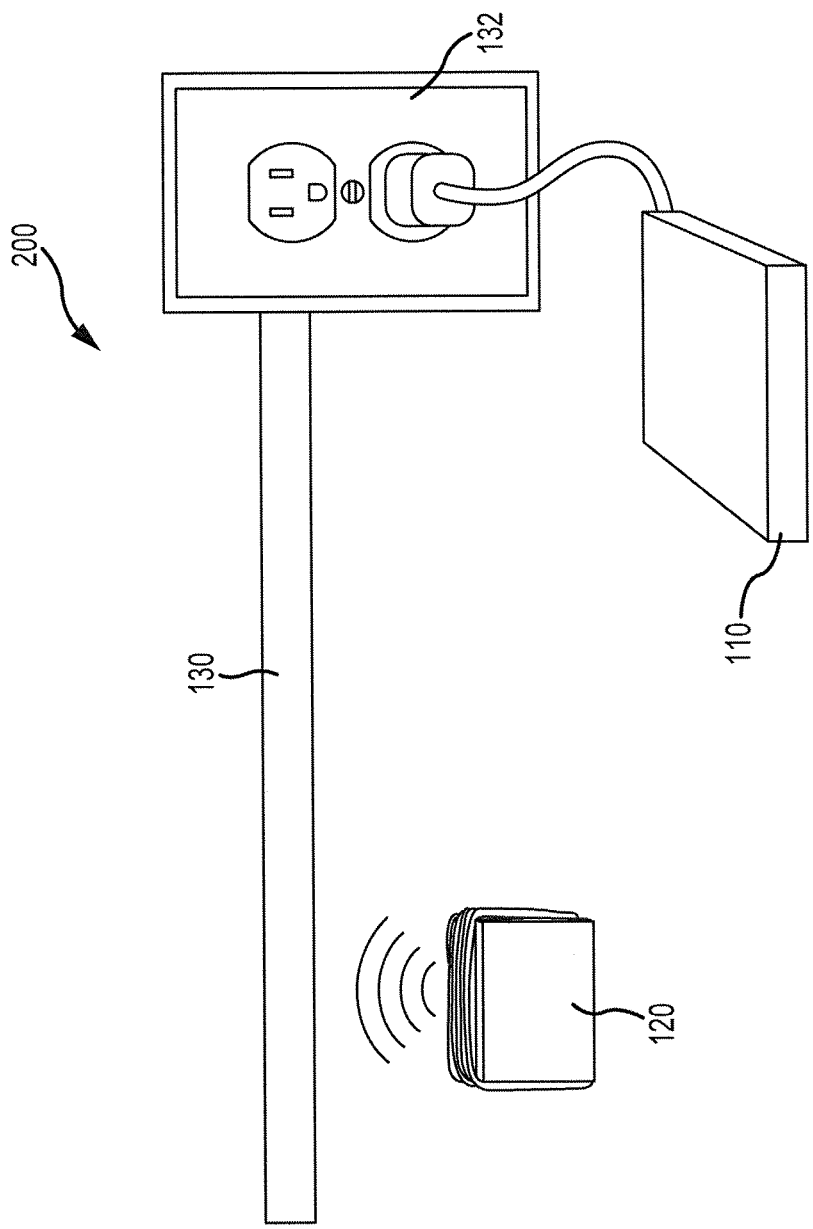
FIG. 2 is a block diagram of a sensing system including sensing nodes and a base station according to an embodiment of the disclosure.

FIG. 2 is a schematic view of a sensing system 200 configured in accordance with embodiments of the present disclosure. The sensing system 200 includes a base station 110 and one or more sensor nodes 120 (only a single sensor node 120 is shown in the illustrated embodiment). The base station 110 is electrically connected to a power line 130, such as a power line in a house or building. In some embodiments, for example, the base station 110 can be plugged into a conventional power outlet 132. In other embodiments, however, the base station 110 may be electrically connected to the power line 130 using a different arrangement and/or be powered using other suitable techniques. The power line 130 can be generally defined as any suitable electrically conductive structure capable of carrying an electrical signal. For example, the power line 130 can include electrically conductive plumbing such as copper pipes, electrical structures in a building such as rebar, or other structural components. The power line 130 can also include appliances such as dishwashers, televisions, lamps, or other appliances that are electrically connected to electrical structures in the building.

The sensor nodes 120 can be positioned throughout a house, building, or other structure where they can successfully transmit data to the power line 130. For example, the sensor nodes 120 can be positioned near walls having installed power lines 130, or near electrically conductive plumbing, or near any other electrically conductive structure to reduce the distance over which the sensor nodes 120 must transmit a signal. The distance between the sensor nodes 120 and the nearest power line 130 can be relatively large, but due to the long wavelength of the receiving antenna (e.g., approximately 11 meters), the transmission is still considered to be a near-field transmission. The sensor nodes 120 are generally positioned where they can detect an environmental condition. For example, if sensor nodes are employed to detect humidity, one or more sensor nodes 120 can be positioned in a basement or other place where humidity is likely to accumulate. In other embodiments, the sensor nodes 120 can be carried by a human or other living organism, and can be configured to detect a biological characteristic of the living organism. The sensor nodes 120 can gather data regarding the environmental condition and relay the data wirelessly to the power line 130, and the power line 130 can carry the signal back to the base station 110. In some embodiments, the base station 110 can transmit a signal back to the sensor node 120.

The sensor node 120 may be configured to transmit electrical signals to the nearest power line 130. The shorter the distance between the sensor node 120 and the power line 130, the less power that is generally required to transmit electrical signals from the sensor node 120 For example, in some embodiments individual sensor nodes 120 may consume between 4 mW and 100 mW during operation.

In some embodiments, the sensor nodes 120 can transmit data to the power line 130 at a relatively low frequency, such as approximately 13.56 MHz, 27.12 MHz, or another suitable frequency. The sensing system can be used on virtually any suitable frequency, although many frequencies may be occupied or otherwise inaccessible due to local regulations. By some measurements, this transmission frequency may be considered inefficient. However, existing power lines 130, such as electrical installations and the like, are comparatively large and therefore are very efficient receiving antennas. The resulting wireless transmission is accordingly a long-range, near-field transmission. The sensor node 120 can be positioned within a house or building where the power line 130 of the building generally surrounds individual sensor nodes 120. The wireless transmission may be considered "long-range" because, in at least some aspects, the distance from the sensor node 120 to the base station 110 is large compared to the dimensions of the sensor node 120. The wireless transmission may be considered "near-field" because the distance between the sensor node 120 and the power line 130, which is the receiving antenna, is generally smaller than approximately 1.5 times the wavelength of the receiving antenna (e.g., at 27 MHz, the wavelength is approximately 11 meters). In other embodiments, however, the sensor nodes 120 can transmit data using different frequencies.

Figure 3:
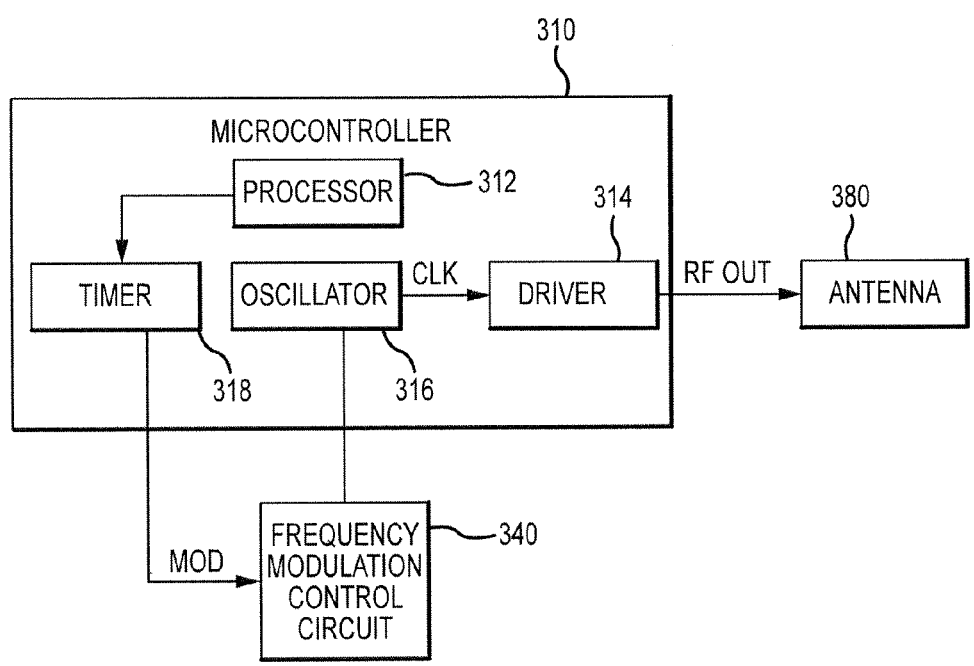
FIG. 3 is a block diagram of a sensor node according to an embodiment of the disclosure.

FIG. 3 is a schematic view of the components of an individual sensor node 300 configured in accordance with an embodiment of this disclosure. The sensor node 300 may include, for example, a microcontroller 310 coupled to a sensor 304 that provides to the microcontroller 310 an electrical signal having a value based on an environmental parameter. The microcontroller 310 is further coupled to a modulation circuit 340 and an antenna 380. The microcontroller 310 may be coupled to a power source (not shown), such as a battery, a solar cell, or other suitable power source. As described herein, in some embodiments the power requirements for the sensor node 300 can be between 4 mW and 100 mW. The sensor node 300 may be used to implement the sensor nodes 120(0-6) of FIG. 1 and/or the sensor node 120 of FIG. 2.

Examples of sensor nodes described herein may advantageously make use of microcontroller components to perform data transmission. For example, as shown in FIG. 3, an oscillator 316 may be included in the microcontroller 310, which oscillator 316 may in part control a clock of the microcontroller 310. In examples described herein, frequency modulation control circuitry 340 may be provided which may be coupled to the oscillator 316 to provide a frequency modulated signal for data transmission. Moreover, the microcontroller 310 may include a driver 314 which may typically be designed as a digital output buffer. However, in examples described herein, the driver 314 may be utilized to provide an analog output signal to an antenna for transmission. Moreover, example techniques are described herein to reduce or minimize an amount of time that a processor 312 included in the microcontroller 310 may need to be operated. Reducing or minimizing the amount of time the processor 312 is on may reduce power consumption of the transmitter using microcontroller components.

The sensor 304 may be implemented using any sensor that is known in the art, for example, an optical sensor for detecting the presence or absence of light, a thermistor for detecting temperature, a MEMS device, other sensing mechanisms, or combinations thereof. The sensor 304 may deliver a signal representing the sensed data to the microcontroller 310.

The microcontroller 310 may be an ultra low-power microcontroller (e.g., a Texas Instruments MSP 430) or another suitable microcontroller. In some embodiments, the microcontroller 310 may control timing for the sensor node 300, manage power to the sensor 304, control modulation of a radio frequency output signal RF OUT wirelessly transmitted via the antenna 380, and control transmission power of the RF OUT signal from the antenna 380.

The microcontroller 310 may include a processor 312, which may receive and process the electrical signal from the sensor 304. For example, the processor 312 may generate a data packet based on the electrical signal from the sensor 304. The microcontroller 310 may further include a timer 318 that is coupled to the processor 312. The timer 318 may be execute a timing cycle responsive to register values. For example, the timer 318 may provide an output signal having an initial logic level (e.g. HIGH), and may then count to a value indicated by one or a combination of register values. On reaching the value, the timer 318 may pulse an output signal to a different logic level (e.g. LOW) and then back to the initial logic level. In this manner, the register values may be related to a signal output from the timer. For example, the register values may indicate pulse widths of the signal output from the timer. The register values may be set by the processor 312. The register values set by the processor 312 may be based on data of the data packet. In some embodiments, the timer 318 may provide a modulation signal MOD to the modulation circuit 340 that is toggled responsive to timer cycles. In other embodiments, the processor 312 may provide the MOD signal to the modulation circuit 340 that is toggled corresponding to the timer cycles of the timer 318.

The microcontroller 310 may further include an internal digital clock oscillator (oscillator) 316 that is coupled to the modulation circuit 340. The frequency of a clock signal CLK provided from the oscillator 316 may be modulated responsive to the modulation circuit 340.

The microcontroller 310 may further include an input/output (I/O) buffer (buffer) 314 that receives the CLK signal from the oscillator 316. The buffer 314 may be coupled to the antenna 380 to drive, based on the CLK signal, the RF OUT signal for transmission by the antenna 380.

The modulation circuit 340 may modulate the frequency of the CLK signal provided by the oscillator 316 based on the MOD signal received from the microcontroller 310. For example, the modulation circuit 340 may add capacitance to and/or remove capacitance from a resonant tank of the oscillator 316 based on the MOD signal. The added or removed capacitance may adjust the frequency of the CLK signal provided by oscillator 316.

The antenna 380 may transmit the RF OUT signal received from the buffer 314. In some embodiments, the antenna may include a resonant tank to generate a sinusoidal wave from a square wave driven at the output of the buffer 314. In this manner, the buffer 314, designed as a digital I/O buffer, may be used as an analog driver to provide an analog signal for transmission to an antenna.

In operation, sensor 304 may passively monitor an environmental condition with the microcontroller 310 switched off. For example, microcontroller 310 may be switched off unless the monitored environmental condition reaches a predetermined threshold level, at which point the sensor 304 may initiate a transmission. By way of example, if the sensor node 300 is used to monitor a temperature in a refrigerator, the sensor node 300 may transmit no data until the temperature in the refrigerator reaches a level at which the contents of the refrigerator may be at risk. The sensor node 300 may initiate a transmission to a base station (e.g., the base station 110 of FIGS. 1 and/or 2), reporting the increased temperature by switching on the microcontroller when needed. In other embodiments, the sensor node 300 may operate according to a predetermined schedule.

The sensor node 304 may provide an electrical signal to the microcontroller 310 that is indicative of or related to an environmental condition or parameter, such as light, moisture, sound, vibration, movement, temperature, static electricity, gas (e.g., carbon monoxide), radiation, or any other measurable environmental condition. The microcontroller 310 may process the electrical signal from the sensor 304, and generate a data packet based on the processed electrical signal. Based on the data packet, the microcontroller 310 may be configured to use existing features of the microcontroller 310, (e.g., the processor 312, the oscillator 316, the timer 318, and the buffer 314), in conjunction with the modulation circuit 340, to modulate the data of the data packet onto the RF OUT signal. The modulation may include using a frequency-shift keying (FSK) modulation scheme (e.g., a binary 2-FSK scheme). The modulated data may be wirelessly transmitted via the antenna 380. By taking advantage of existing capabilities and components of the microcontroller 310, and in some cases repurposing certain hardware on the microcontroller 310, providing the RF OUT signal without extensive custom analog modulation and transmission circuitry may decrease power consumption and complexity of the sensor node 300, which may improve longevity and reliability of the sensor node 300.

As previously described, the processor 312 may receive electrical signals from the sensor 304, and may generate a data packet based on the electrical signals. In some embodiments, the processor 312 may receive data from or generate data based on another input source, or may internally compute data to be transmitted. The data packet may be encoded by the processor 312 using, for example, a run-length limited (RLL) encoding scheme, a hybrid error correcting code (ECC) and RLL encoding scheme (ECC/RLL), or another encoding scheme. The processor 312 may, for example, translate the data packet into pulse widths, which may be used to control timing of toggling the MOD signal provided to the modulation circuit 340. In order to reduce power consumption during transmission of the data of the data packet, the timer 318 may be employed to time toggle the MOD signal provided to the modulation circuit 340. The MOD signal from the timer 318 may generally be toggled at the correct data rate based on the data of the data packet to be transmitted. Thus, the processor 312 may convert the pulse widths indicative of the data packet to corresponding register values that are used to configure timer cycles of the timer 318. Each set of register values may designate a start time and a stop time of a timer cycle of the timer 318. The timer 318 may toggle the MOD signal responsive to completion of a timer cycle associated with a set of register values in a timer configuration register.

The processor 312 may configure a timer configuration register with one set of register values at a time in some examples. In this case, the timer 318 may run continuously, toggling (e.g., providing a pulse on) the MOD signal responsive to completion of each timer cycle, which timer cycles correspond with the times specified by register values stored in the timer configuration register. In order to transmit the data of the whole packet, the timer configuration registers may be updated each timer cycle until the entire data packet has been transmitted. Thus, the processor 312 may provide a first set of register values to the timer 318. The timer 318 may generate a pulse on the MOD signal responsive to completion of a first timer cycle based on the first set of register values. Responsive to the pulse of the MOD signal, the modulation circuit 340 may shift the frequency of the oscillator 316 by switching load capacitors into the resonant tank of the oscillator 316. Upon completion of the pulse of the MOD signal, the modulation circuit 340 may decouple the capacitors switched into the resonant tank of the oscillator 316, causing the frequency of the oscillator 316 to return to a previous frequency output. By shifting the resonant frequency of the oscillator 316, the packet data may be encoded on the CLK signal provided from the oscillator 316 as FSK data. For example, while the MOD signal has a first value, the oscillator 316 provides the CLK signal having first frequency, and while the MOD signal has a second value, the oscillator 316 provides the CLK signal having second frequency. The CLK signal may be provided to the buffer 314. The buffer 314 may drive the RF OUT signal to the antenna 380 for wireless transmission based on the CLK signal provided by the oscillator 316.

In some embodiments, the timer 318 may provide an interrupt to the processor 312 after completion of a timer cycle. Responsive to the interrupt, the processor 312 may configure a timer configuration register of the timer 318 register with a next set of register values for generation of a next pulse of the MOD signal. This process may continue until a timer cycle associated with the last set of register values has been completed. In some embodiments, the processor 312 may be turned off during a portion of the time in which the data packet is being transmitted. For example, the processor 312 may be turned off during one or more timer cycles associated with transmission of the data packet. The timer 318 may be configured to provide an interrupt to the processor 312 to turn on the processor 312 for configuration of a next set of register values in the register of the timer 318. Turning off the processor 312 during the timer cycles may advantageously reduce power consumption during transmission of the data packet. In some embodiments, the processor 312 may turn off after generating and storing the register values, and direct memory access (DMA) circuitry (not shown) may configure the timer configuration register of the timer 318 with updated register values responsive to an interrupt from the timer 318.

In some examples described herein, drive power delivered to the antenna may be adjusted. This may advantageously balance the power consumption of the sensing node 300 with the signal-to-noise ratio seen at a receiver. One way to vary the drive power to the antenna 380 is to change a value of a variable resistor coupled in series with the loop antenna of the antenna 380. This may limit the current into the loop antenna, but may also reduce the quality factor (Q) of the loop antenna.

The drive power can additionally or instead be varied by changing the supply voltage of the buffer 314. Recall that the buffer 314 is a component of the microcontroller 310. The buffer 314 power supply may be able to be set independent of the microcontroller's 310 power supply voltage. For example, some microcontrollers may provide for a different supply voltage pin or other connection to the buffer 314 for supplying a power supply voltage to the buffer 314. Thus, the drive power of the buffer 314 that drives the RF OUT signal on the antenna 380 may be configured without affecting power to other circuitry of the microcontroller 310. In some embodiments, the power supply powering the buffer 314 may have a configurable voltage between 1.8 and 5.5 V. The buffer 314 may be coupled to an external supply voltage, a separate regulated voltage, or simply through a series resistor to the power supply for the other circuitry of the microcontroller 310. In an embodiment, the series resistor may be a series potentiometer, which can be used to configure the power supply powering the buffer 314. This may be advantageous because the current consumption of the buffer 314 may be relatively constant, and may be desirable over a regulator in some examples, because no or minimal current may be consumed when the sensing node 300 is off.

The power of the buffer 314 may additionally or instead be varied by adjusting the drive strength of the buffer 314. For example, assuming a relatively constant voltage, when in a first drive strength mode the maximum current is a first current (e.g., 20 mA at 5.0 V), and while in a second drive strength mode the maximum current is a second value that is less than the first value (e.g., 12 mA at 5.0 V). Certain microcontrollers may include a register (not shown) which may store a drive strength parameter. Adjusting a value in the register may adjust the drive strength of the buffer, and may allow for a variable power transmitter to be implemented using the microcontroller.

All three methods to vary the transmit power may be combined, or any sub-combinations may be used, to give fine control of the output power and antenna Q. Since the power consumption of the buffer 314 can be varied between, for example, 0 and 100 mW (20 mA at 5.0 V), and the power consumption with a very high impedance load is 4.74 mW (1.58 mA at 3.0 V), then the power consumption of the whole node during transmission can vary between 4.74 mW and 100 mW in one example.

Other modulation schemes may be used to encode the data for wireless transmission via the antenna 380. Also, as previously described, the data packet may be generated from or based on other input data or data generated by the microcontroller 310. Also as previously described, the processor 312 may control the MOD signal to the modulation circuit 340, but use the timer 318 to control timing of toggling the MOD signal.

Figure 4:
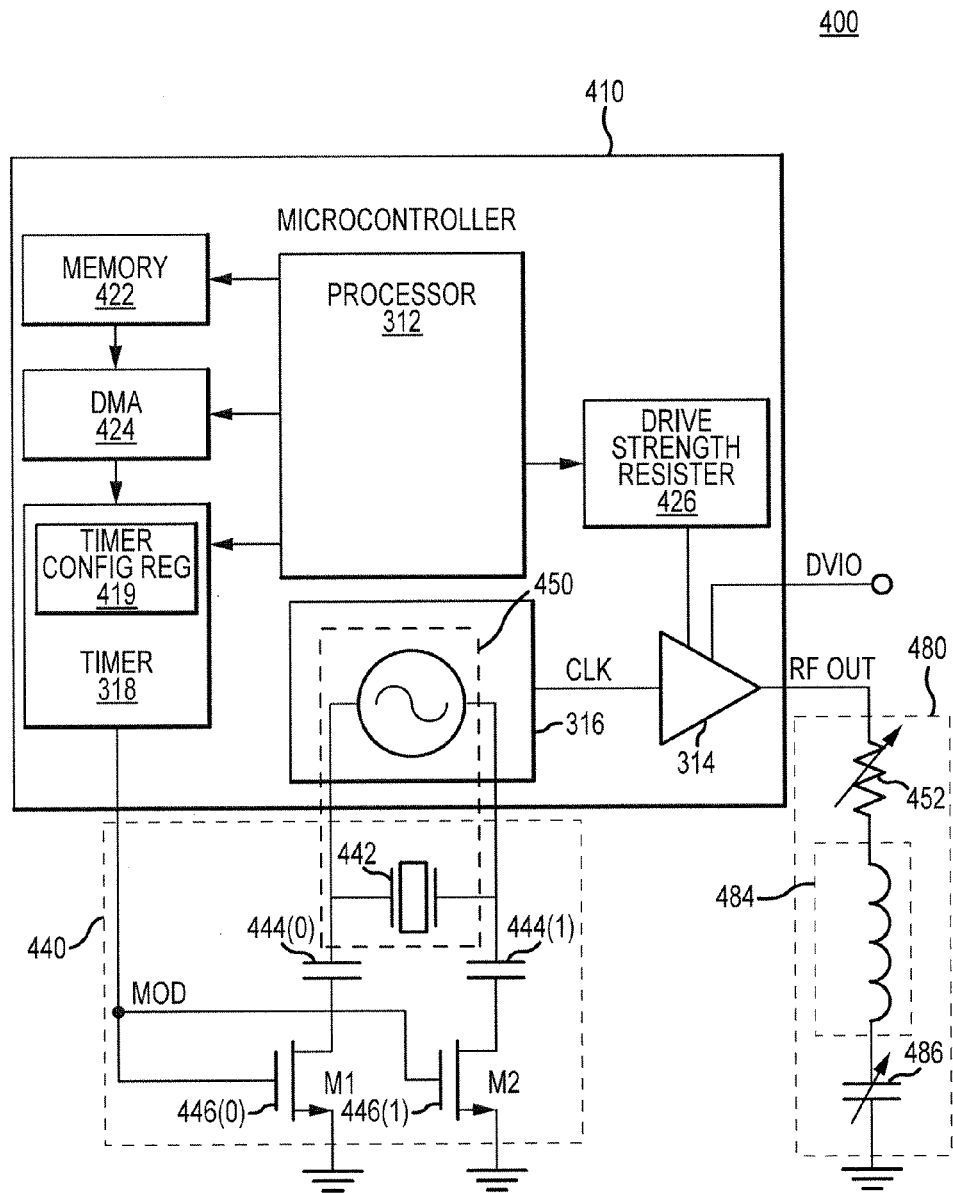
FIG. 4 is a block diagram of a sensor node according to an embodiment of the disclosure.

FIG. 4 is a schematic view of components of a sensor node 400 configured in accordance with an embodiment of this disclosure. The sensor node 400 may include, for example, a microcontroller 410 coupled to a sensor 304 that provides to the microcontroller 410 an electrical signal having a value based on an environmental parameter. The microcontroller 410 is further coupled to a modulation circuit 440 and an antenna 480. The microcontroller 410 may be coupled to a power source (not shown), such as a battery, a solar cell, or other suitable power source. As described herein, in some embodiments the power requirements for the sensor node 400 can be between 4 mW and 100 mW. The sensor node 400 includes elements that have been previously described with respect to the sensor node 300 of FIG. 3. Those elements have been shown in FIG. 4 using the same reference numbers used in FIG. 3 and operation of the common elements is as previously described. Consequently, a detailed description of the operation of these elements will not be repeated in the interest of brevity. The sensor node 400 may be used to implement the sensor nodes 120(0-6) of FIG. 1, the sensor node 120 of FIG. 2, and/or the sensor node 300 of FIG. 3.

The microcontroller 410 may be an ultra low-power microcontroller (e.g., a Texas Instruments MSP 430) or another suitable microcontroller. In some embodiments, the microcontroller 410 may control timing for the sensor node 400, manage power to the sensor 404, control modulation of an RF OUT signal wirelessly transmitted via the antenna 480, and control transmission power to the antenna 480. The microcontroller 410 may include a memory 422 that stores the data packet, pulse widths, and register values generated by the processor 312. The processor 312 may retrieve data associated with the data packet, the pulse widths, and/or the register values during transmission of the data packet. The microcontroller 410 may further include direct memory access (DMA) circuitry 424 that may interface with the memory 422 to store or retrieve the data packet, pulse widths, the register values, or other information. The timer 318 may include a timer configuration register 419 that may store the register values provided by the processor 312 and/or the DMA circuitry 424.

The DMA circuitry 424 and the timer 318 may be configured by the processor 312 to communicate directly with each other. For example, the timer 318 may provide an interrupt to the DMA circuitry 424 responsive to completion of a timer cycle, and the DMA circuitry 424 may respond to the interrupt by retrieving a next set of register values from the memory 422 and configuring the timer configuration register 419 with the next set of register values.

The microcontroller 310 may further include a drive strength register 426 that controls the drive strength of the buffer 314. The drive strength register 426 may be configured by the processor 312 based on a desired output power of the RF OUT signal driven on the antenna 480.

The modulation circuit 440 may modulate the frequency of the oscillator 316 based on the MOD signal received from the microcontroller 410. The modulation circuit 440 may include an external crystal resonator 442 that is coupled in parallel with the oscillator 316 to form a transmit oscillator 450. In some embodiments, the external crystal resonator 442 may have a resonant frequency of 27 MHz. The modulation circuit 440 may further include a first capacitor 444(0) coupled in series with a transistor M1 460(0) between a first node of the transmit oscillator 450 and a reference node. The modulation circuit 440 may further include a second capacitor 444(1) coupled in series with a transistor M2 460(1) between a second node of the transmit oscillator 450 and the reference node. The first and second capacitors 444(0-1) may have equal capacitances. The transistors M1 and M2 446(0-1) may be enabled via the MOD signal from the microcontroller 410. Enabling the transistors M1 and M2 446(0-1) may switch the capacitors 444(0-1) into the resonant tank of the transmit oscillator 450 to modulate the frequency of the transmit oscillator 450.

The antenna 480 may transmit the RF OUT signal received from the buffer 314. The antenna 480 may include a loop antenna 484 coupled in series with a resonant tank (e.g., a capacitor) 486 to generate a sinusoidal wave from a square wave driven by the buffer 314. In some embodiments, the antenna 480 may include a variable resistor 482 that adjusts the transmit power of the loop antenna 484. Accordingly, the buffer 314 of the microcontroller, which may be designed to be a digital I/O buffer for use by the microcontroller, may be used to provide an analog signal to an antenna for use in a transmitter. In this manner, a separate transmit buffer may not be required in sensor nodes including microcontrollers described herein. By utilizing components such as the driver, the oscillator, and the processor of a microcontroller to provide a transmitter, the complexity of the sensor node in total may be reduced.

In operation, the sensor node 304 may provide an electrical signal to the microcontroller 410 that is indicative of or related to an environmental condition. The microcontroller 410 may process the electrical signal from the sensor 304, and generate a data packet based on the processed electrical signal. In some embodiments, the packet of data may be encoded using a run-length limited (RLL) encoding scheme. In other embodiments, the data packet may be encoded using a hybrid error correcting code (ECC) and RLL (ECC/RLL) encoding scheme. Encoding using a run-length limited encoding scheme or the hybrid ECC/RLL encoding scheme may improve reliability and increase bandwidth as compared with not encoding the data. Based on the data packet, the microcontroller 410 may be configured to modulate the data of the data packet onto the RF OUT signal using a frequency-shift keying (FSK) modulation scheme. The modulation may utilize, in conjunction with the modulation circuit 440, existing features of the microcontroller 410 (e.g., the processor 312, the oscillator 316, the timer 318, the buffer 314, the memory 422, the DMA circuitry 424, and/or the drive strength register 426). The RF OUT signal may be transmitted via the antenna 480. By taking advantage of existing capabilities of a microcontroller 410, and in some cases repurposing certain hardware on the microcontroller 410, providing the RF OUT signal without extensive custom analog modulation and transmission circuitry may decrease power consumption and complexity of the sensor node 400, which may improve longevity and reliability of the sensor node 400. Note that the components of the microcontroller used to form a transmitter described herein may also continue to be used for their initial purpose in the microcontroller (e.g. processing sensor data).

The processor 312 may store the generated data packet in the memory 422. The processor 312 may translate the data packet into pulse widths and store the pulse widths in the memory 422. The pulse widths may be used to control timing of toggling the MOD signal provided to the modulation circuit 440. The timer 318 may be employed to time the toggling of the MOD signal provided to the modulation circuit 440. The MOD signal from the timer 318 may be toggled at a data rate according to the data of the data packet to be transmitted. Thus, the processor 312 may convert the pulse widths to corresponding register values that are used to configure timer cycles of the timer 318 using the timer configuration register 419. The register values may be stored in the memory 422 by the processor 312. The timer 318 may provide a pulse on the MOD signal responsive to completion of a timer cycle that is associated with a set of register values configured in the timer configuration register 419.

The processor 312 (and/or the DMA circuitry 424, in some embodiments) may configure the timer configuration register 419 with one set of register values at a time. In this case, the timer 318 may run continuously, toggling the MOD signal responsive to completion of timer cycles at the times that are specified by register values configured in its timer configuration register 419. In order to transmit the data of the entire data packet, the timer configuration register 419 may need to be updated upon completion of each timer cycle until the entire data packet has been transmitted. Thus, the processor 318 may configure the timer configuration register 419 with a first set of register values. The timer 318 may generate a pulse on the MOD signal responsive to completion of a first timer cycle that is based on the first set of register values. Responsive to the pulse of the MOD signal, the modulation circuit 440 may shift the frequency of the transmit oscillator 450. For example, the pulse on the MOD signal may enable the M1 and M2 transistor 446(0-1), which may switch the first and second capacitors 444(0-1) into the resonant tank of the transmit oscillator 450.

Upon completion of the pulse of the MOD signal, the modulation circuit 440 decouples the first and second capacitors 444(0-1) switched into the resonant tank of the transmit oscillator 450 (e.g., by disabling the M1 and M2 transistors 446(0-1), causing the frequency of the transmit oscillator 450 to return to a previous frequency output. By shifting the frequency of the transmit oscillator 450 between at least two different values, the oscillator 316 may provide the CLK signal that is frequency shift keyed based on the packet data. For example, while the MOD signal has a first value, the oscillator 316 provides the CLK signal having first frequency, and while the MOD signal has a second value, the oscillator 316 provides the CLK signal having second frequency. The amount of the frequency shift (e.g., the modulation depth) between the first frequency and the second frequency may be based on the capacitances of the first and second capacitors 444(0-1). In some embodiments, the amount of frequency shift is at least 10 kHz. In an example, when the first and second capacitors 444(0-1) have capacitances of 47 pF, the frequency shift is approximately 15 kHz.

The CLK signal may be provided to the buffer 314. The buffer 314 may drive the RF OUT signal to the antenna 480 for wireless transmission based on the CLK signal provided by the oscillator 314. The RF OUT signal provided by the buffer 314 may be transmitted by the loop antenna 484. In some embodiments, the buffer 314 may be a digital buffer that may be designed to drive a square wave, and the resonant tank 486 of the antenna 480 may form a sinusoidal wave from the square wave for transmission via the loop antenna.

As previously described, the timer 318 may provide an interrupt to the processor 312 after completion of a timer cycle. Responsive to the interrupt, the processor 312 may configure the timer configuration register 419 with a next set of register values (e.g., retrieved from the memory 422). The timer 318 may complete a next timer cycle based on the next pulse of the MOD signal, and may generate another interrupt to the processor. This process may continue until a timer cycle associated with the last set of register values has been completed. In some embodiments, the processor 312 may be turned off during a portion of the time in which the data packet is being transmitted. For example, the processor 312 may be turned off during one or more timer cycles associated with transmission of the data packet. The interrupt provided by the timer 318 to the processor 312 may turn on the processor 312 to configure the timer configuration register 419 with a next set of register values. Turning off the processor 312 during the timer cycles may reduce power consumption during transmission of the data packet. In other embodiments, the processor 312 may configure the DMA circuitry 424 and the timer 318 to communicate with each other for retrieval and configuring of the timer configuration register 419 after each timer cycle.

Thus, the processor 312 may remain off after the register values are generated and stored in the memory 422. The timer 318 may provide an interrupt to the DMA circuitry 424. Responsive to the interrupt from the timer 318, the DMA circuitry 424 may retrieve a next set of register values from the memory 422 and configure the timer configuration register 419 with the next set of register values.

Drive power delivered to the loop antenna 484 may be adjustable in some examples in order, for example, to balance the power consumption of the sensing node 400 with the signal-to-noise ratio seen at a receiver. One way to vary the drive power to the loop antenna 484 is to change a value of the variable resistor 482 coupled in series with the loop antenna 484. This may limit the current into the loop antenna 484, but may also reduce the quality factor (Q) of the loop antenna 484. In some embodiments, the antenna 480 does not include the variable resistor 482, and the drive power is controlled elsewhere.

For example, the drive power may additionally or instead be varied by changing the supply voltage (DVIO) to the buffer 314. The DVIO power supply may be set independently from the microcontroller's 410 power supply voltage. Thus, the drive power of the buffer 314 that drives the RF OUT signal on the loop antenna 484 may be configured without affecting power to other circuitry of the microcontroller 410. In some embodiments, the DVIO power supply provided to the buffer 414 may have a configurable voltage between 1.8 and 5.5 V. The DVIO power supply may be provided from an external supply voltage, a separate regulated voltage, or simply through a series resistor to the power supply for the other circuitry of the microcontroller 410. In an embodiment, the series resistor may be a series potentiometer, which can be used to configure the supply voltage to the buffer 314. This may be advantageous because the current consumption of the buffer 314 may be relatively constant, and may be desirable over a regulator, because no or reduced current may be consumed when the sensing node 400 is off.

The drive power of the buffer 314 may additionally or instead be configured by adjusting the drive strength of the buffer 314. For example, assuming a relatively constant voltage, when in a first drive strength mode the maximum current is a first current (e.g., 20 mA at 5.0 V), and while in a second drive strength mode the maximum current is a second value that is less than the first value (e.g., 12 mA at 5.0 V).

All three methods to vary the drive power can be combined, or any sub-combinations thereof, to give fine control of the output power and antenna Q. Since the drive power of the buffer 314 can be varied between, for example, 0 and 100 mW (20 mA at 5.0V), and the power consumption with a very high impedance load is 4.74 mW (1.58 mA at 3.0 V), then the power consumption of the whole node during transmission can vary between 4.74 mW and 100 mW in one example.

In some embodiments, modulation schemes other than a FSK modulation scheme may be used to encode the data for wireless transmission via the antenna 480. Also, as previously described, the data packet may be generated by the processor 312 from or based on other input data or data generated by the microcontroller 310. Also as previously described, the processor 312 may control the MOD signal to the modulation circuit 440, but use the timer 318 to determine timing of toggling the MOD signal.

Figure 5:
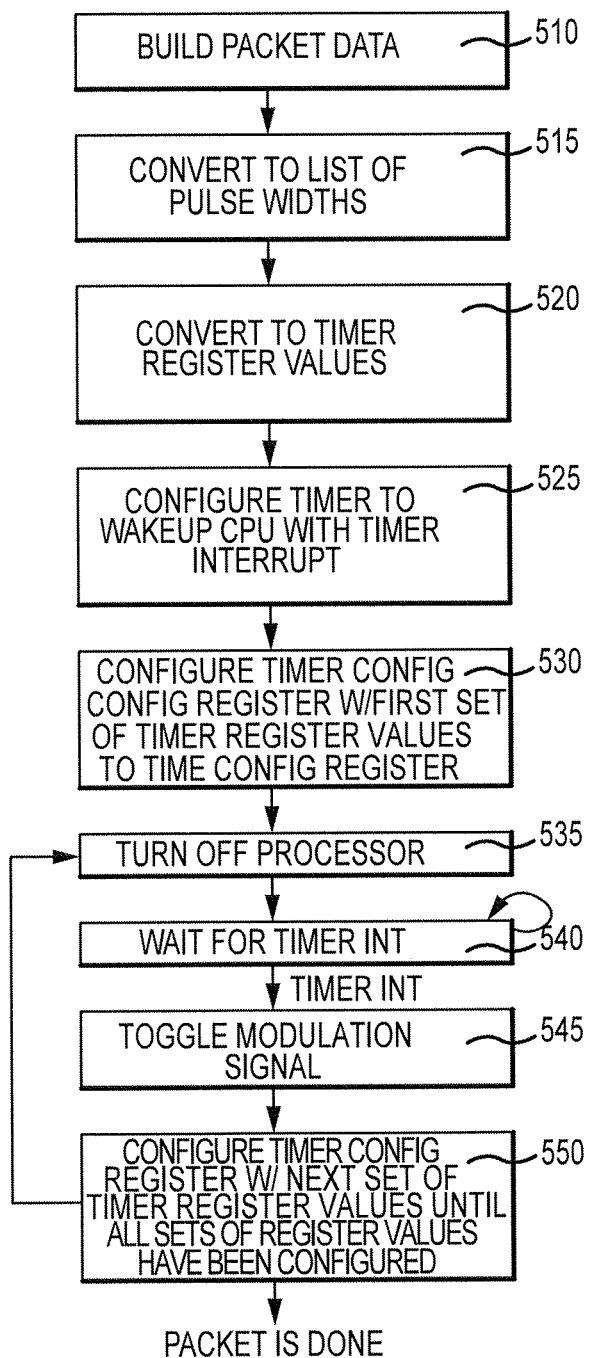
FIG. 5 is a flow diagram of an embodiment of a method of toggling a modulation signal based on sensor data according to an embodiment of the disclosure.
Figure 6:
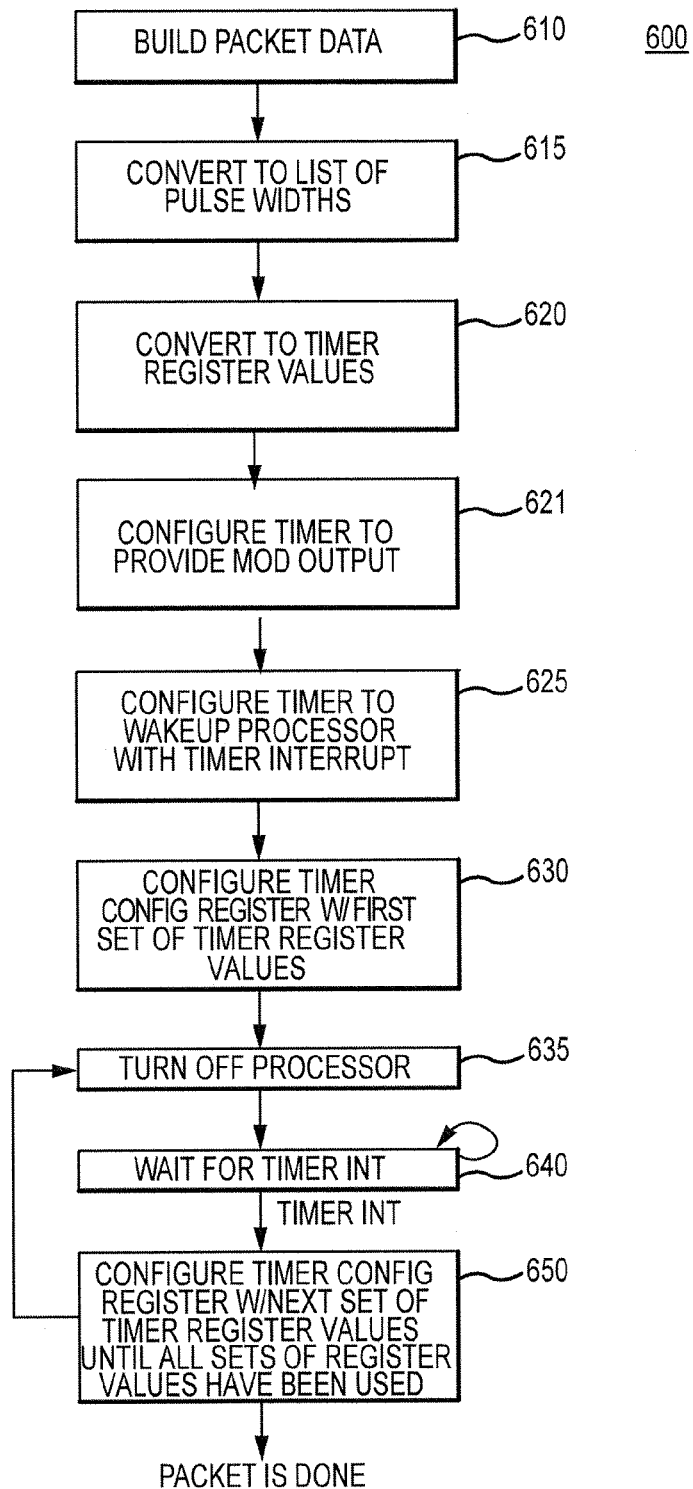
FIG. 6 is a flow diagram of an embodiment of a method of toggling a modulation signal based on sensor data according to an embodiment of the disclosure.
Figure 7:
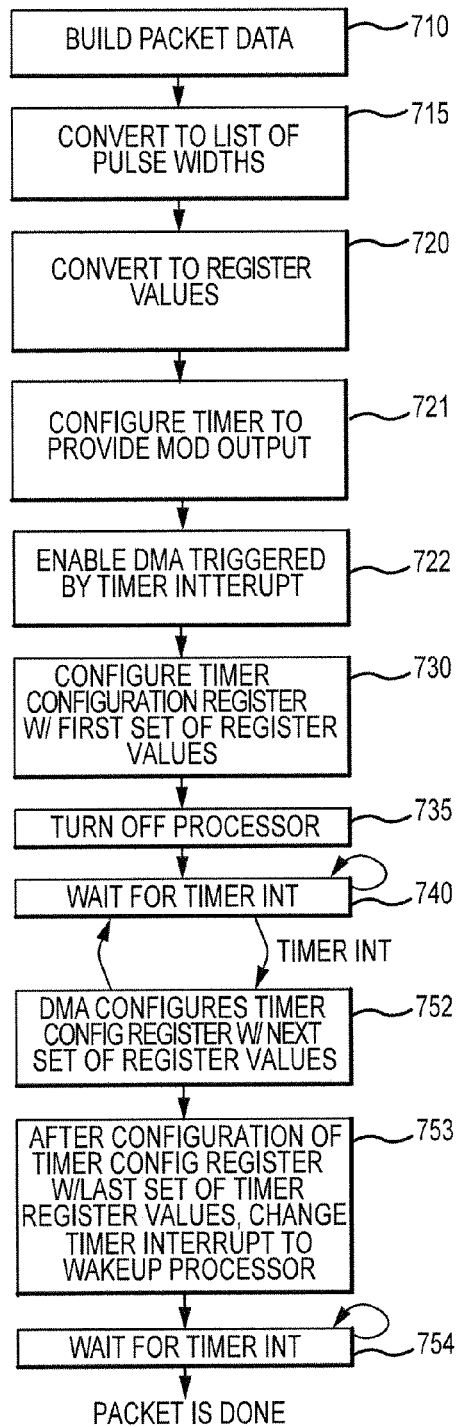
FIG. 7 is a flow diagram of an embodiment of a method of toggling a modulation signal based on sensor data according to an embodiment of the disclosure.

FIGS. 5-7 are flowcharts of methods for wirelessly toggling a modulation signal based on sensor data according to embodiments of the disclosure. FIG. 5 is a flowchart 500 for a method for wirelessly toggling a modulation signal based on sensor data where a processor controls toggling of the modulation signal. The method illustrated by the flowchart 500 may be implemented by the sensor nodes 120(0-6) of FIG. 1, the sensor node 120 of FIG. 2, the sensor node 300 of FIG. 3, and/or the sensor node 400 of FIG. 4.

The method 500 may include encoding a data packet, at 510. Encoding the data packet may be completed at a microcontroller (e.g., the microcontroller 310 of FIG. 3 and/or the microcontroller 410 of FIG. 4). Encoding the data packet may include receiving and processing an electrical signal from a sensor, such as the sensor 304 of FIGS. 3 and 4. In some embodiments, the data packet may be encoded using a RLL encoding scheme and/or an ECC/RLL encoding scheme. The method 500 may further include converting the data packet to pulse widths, at 515. The method 500 may further include converting the pulse widths to register values, and storing the register values in memory (e.g., the memory 422 of FIG. 4), at 520.

The method 500 may further include configuring a timer configuration register with a first set of register values of register values (e.g., the timer configuration register 419 of FIG. 4), at 530. The timer may start a timer cycle based on the first set of register values. The method 500 may further include turning off the processor after configuring the timer configuration register with the first set of register values, at 535. The method 500 may further include waiting for an interrupt from the timer, at 540, which may be provided by the timer upon completion of the timer cycle. In some embodiments, the method 500 may further include receiving an interrupt from the timer. The method 500 may further include toggling a modulation signal responsive to the interrupt from the timer, at 540. Toggling the modulation signal may include waking up the processor. In some embodiments, toggling of the modulation signal may be performed by the processor.

The method 500 may further include configuring the timer configuration register with a next set of register values of the register values, at 550. Configuring the timer configuration register with a next set of register values may include retrieving the next set of register values from the memory. The method 500 may further include repeating steps 535 to 550 until an interrupt associated with a last set of register values is received at the processor. The method 500 may further include stopping the timer.

FIG. 6 is a flowchart 600 for a method for toggling a modulation signal based on sensor data where a timer controls toggling of the modulation signal. The method illustrated by the flowchart 600 may be implemented by the sensor nodes 120(0-6) of FIG. 1, the sensor node 120 of FIG. 2, the sensor node 300 of FIG. 3, and/or the sensor node 400 of FIG. 4.

The method 600 may include encoding a data packet, at 610. Encoding the data packet may be completed at a microcontroller (e.g., the microcontroller 310 of FIG. 3 and/or the microcontroller 410 of FIG. 4). Encoding the data packet may include receiving and processing an electrical signal from a sensor, such as the sensor 304 of FIGS. 3 and 4. In some embodiments, the data packet may be encoded using a RLL encoding scheme and/or an ECC/RLL encoding scheme. The method 600 may further include converting the data packet to pulse widths, at 615. The method 600 may further include converting the pulse widths to register values, and storing the register values in memory (e.g., the memory 422 of FIG. 4), at 620.

The method 600 may further include configuring a timer (e.g., the timer 318 of FIG. 3 and/or the timer 318 of FIG. 4) to provide a MOD out signal, at 621. The method 600 may further include configuring a timer configuration register with a first set of register values of the register values (e.g., the timer configuration register 419 of FIG. 4), at 630. The timer may start a timer cycle based on the first set of register values. The method 600 may further include turning off the processor after configuring the timer configuration register with the first set of register values, at 635. The method 600 may further include waiting for an interrupt from the timer, at 640, which may be provided by the timer upon completion of the timer cycle. Further, responsive to an end of the timer cycle, the timer may toggle the modulation signal. The method 600 may further include receiving an interrupt from the timer.

The method 600 may further include configuring the timer configuration register with a next set of register values of the register values responsive to the interrupt, at 650. Configuring the timer configuration register with a next set of register values may include waking up the processor. Configuring the timer configuration register with a next set of register values may further include retrieving the next set of register values from the memory. The method 600 may further include repeating steps 635 to 650 until an interrupt associated with a last set of register values is received at the processor. In some embodiments, the method 600 may further include stopping the timer.

FIG. 7 is a flowchart 700 for a method for toggling a modulation signal based on sensor data where the direct memory access (DMA) circuitry provides the register values to the timer configuration register and the processor remains off during toggling of the modulation signal. The method illustrated by the flowchart 700 may be implemented by the sensor nodes 120(0-6) of FIG. 1, the sensor node 120 of FIG. 2, the sensor node 300 of FIG. 3, and/or the sensor node 400 of FIG. 4.

The method 700 may include encoding a data packet, at 710. Encoding the data packet may be completed at a microcontroller (e.g., the microcontroller 310 of FIG. 3 and/or the microcontroller 410 of FIG. 4). Encoding the data packet may include receiving and processing an electrical signal from a sensor, such as the sensor 304 of FIGS. 3 and 4. In some embodiments, the data packet may be encoded using a RLL encoding scheme and/or an ECC/RLL encoding scheme. The method 700 may further include converting the data packet to pulse widths, at 715. The method 700 may further include converting the pulse widths to register values, and storing the register values in memory (e.g., the memory 422 of FIG. 4), at 720.

The method 700 may further include configuring a timer (e.g., the timer 318 of FIG. 3 and/or the timer 318 of FIG. 4) to provide a MOD out signal, at 721. The method 700 may further include configuring a timer configuration register with a first set of register values of the register values (e.g., the timer configuration register 419 of FIG. 4), at 730. The timer may start a timer cycle based on the first set of register values. The method 700 may further include turning off the processor after configuring the timer configuration register with the first set of register values, at 735. The method 700 may further include waiting for an interrupt from the timer, at 740, which may be provided by the timer upon completion of the timer cycle. Further, responsive to an end of the timer cycle, the timer may toggle the modulation signal. The method 700 may further include receiving an interrupt from the timer at DMA circuitry, such as the DMA circuitry of FIG. 4.

The method 700 may further include configuring, via the DMA circuitry, the timer configuration register with a next set of register values of the register values responsive to the interrupt, at 752. Configuring the timer configuration register with a next set of register values may include waking up the DMA circuitry. Configuring the timer configuration register with a next set of register values may further include retrieving the next set of register values from the memory. The method 700 may further include repeating steps 740 and 752 until the DMA circuitry has configured the timer configuration register with a last set of register values. After the DMA circuitry has configured the timer configuration register with a last set of register values, the method 700 further includes reconfiguring the timer to provide an interrupt to the processor, at 753. The method 700 may further include waiting for an interrupt from the timer, at 754, which may be provided by the timer upon completion of the last timer cycle. The method 700 may further include stopping the timer.

The methods 500, 600, and 700 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods 500, 600, and 700 may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of transmitters, microcontrollers, and/or sensor nodes described herein.

From the foregoing it will be appreciated that although specific embodiments of the technology have been described herein for purposes of illustration, various modifications may be made without deviating from the spirit and scope of the technology. For example, the sensor nodes can operate at a frequency other than 27 MHz (e.g., 13.52, 44 MHz, or another frequency). Also, in some embodiments the microcontroller can be omitted, or the battery can be larger. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

What is claimed is:

1. An apparatus, comprising:
 a microcontroller comprising an oscillator and an input/output buffer, wherein the microcontroller is configured to process an electrical signal and the input/output buffer is configured to drive a digital signal;
 a transmitter including the oscillator and the input/output buffer of the microcontroller, wherein the transmitter further includes:
  a resonator coupled to the oscillator;
  modulation circuitry coupled to the oscillator and resonator and configured to modulate an output of the oscillator responsive to a modulation signal based on the processed electrical signal;
  an antenna coupled to the input/output buffer of the microcontroller for transmission of the data, wherein the antenna is configured to wirelessly couple an analog signal to a powerline; and
  a resonant tank coupled to an output of the input/output buffer to provide the analog signal to the antenna.

2. The apparatus of claim 1, further comprising a sensor configured to provide the electrical signal to the microcontroller responsive to an environmental parameter.

3. The apparatus of claim 1, wherein the modulation circuitry comprises a first capacitor coupled in series with a first transistor between a first node of the oscillator and a reference node; and wherein the modulation circuitry further comprises a second capacitor coupled in series with a second transistor between a second node of the oscillator and the reference node.

4. The apparatus of claim 3, wherein the first transistor is configured to be enabled based on the modulation signal, and where second transistor is configured to be enabled based on the modulation signal.

5. The apparatus of claim 1, wherein the resonant tank a capacitive element coupled in series with the antenna between an output of the input/output buffer and a reference node.

6. The apparatus of claim 5, wherein the resistive element is variable resistor configured to be adjusted to control output power during transmission of the data.

7. The apparatus of claim 1, wherein the input/output buffer comprises a supply input, and wherein the apparatus further comprises a variable supply coupled to the supply input and configured to control output power during transmission of the data.

8. The apparatus of claim 1, wherein the input/output buffer comprises an input configured to control drive strength of the input/output buffer, and wherein the input is coupled to circuitry configured to control output power during transmission of data.

9. The apparatus of claim 1, wherein the microcontroller includes a processor configured to process the electrical signal, and wherein the processor is further configured to provide the modulation signal.

10. The apparatus of claim 9, wherein the processor is further configured to turn off after providing the plurality of register values, wherein the timer is configured to provide an interrupt to the processor to turn on the processor responsive to completing the timer cycle, wherein the processor is further configured to provide a next set of register values to the timer responsive to the interrupt.

11. The apparatus of claim 9, wherein the microcontroller further comprises a direct memory access controller configured to provide register values from the memory to the timer, wherein the processor is configured to turn off after providing the register values to the memory, wherein the timer is configured to provide an interrupt to the direct memory access controller to turn on the direct memory access controller responsive to completing the timer cycle based on the register values, wherein the direct memory access controller is configured to provide a next set of register values to the timer responsive to the interrupt.

12. The apparatus of claim 1, wherein the microcontroller further includes a processor configured to generate a plurality of register values corresponding to the data, and store the register values in a memory, and wherein the microcontroller further comprises a timer coupled to the memory and configured to provide, during a timer cycle, the modulation signal having a sequence of one or more pulses based on the register values.

13. The apparatus of claim 1, wherein the modulation circuitry configured to modulate the output of the oscillator responsive to the modulation signal based on the processed electrical signal comprises the modulation circuitry configured to modulate a frequency of the output of the oscillator responsive to the modulation signal based on the processed electrical signal.

14. A non-transitory computer readable medium comprising instructions that, when executed by one or more processing units, cause the one or more processing units to:
convert a data packet into pulse widths;
convert the pulse widths into register values;
configure a timer configuration register with a first set of register values of the register values, wherein a modulation signal is toggled responsive to completion of a first timer cycle at a timer, wherein the timer cycle is based on the first set of register values;
receive an interrupt from the timer, wherein the timer is configured to provide the interrupt responsive to completion of a last timer cycle, wherein the last timer cycle is based on a last set of register values of the register values; and
wake up the one or more processing units responsive to receiving the interrupt.

15. The non-transitory computer readable medium of claim 14, further comprising instructions that, when executed by one or more processing units, cause the one or more processing units to turn off after configuring the timer configuration register with the first set of register values.

16. The non-transitory computer readable medium of claim 14, wherein the interrupt is a last interrupt, the non-transitory computer readable medium further comprising instructions that, when executed by one or more processing units, cause the one or more processing units to:
receive a first interrupt from the timer; and
configure the timer configuration register with a next set of register values of the register values responsive to the first interrupt.

17. The non-transitory computer readable medium of claim 16, further comprising instructions that, when executed by one or more processing units, cause the one or more processing units to toggle the modulation signal.

18. The method of claim 17, wherein the first set of register values identify a start time and a stop time for the first timer cycle.

19. A method, comprising:
converting, at a processor of a microcontroller, a data packet into pulse widths;
converting the pulse widths into register values;
configuring a timer configuration register of the microcontroller with a first set of register values of the register values;
toggling a modulation signal at an output of the timer responsive to completion of a first timer cycle at a timer of the microcontroller, wherein the timer cycle is based on the first set of register values;
providing, from the timer to the processor, an interrupt responsive to completion of a last timer cycle, wherein the last timer cycle is based on a last set of register values of the register values; and
turning on the processor responsive to receiving the interrupt.

20. The method of claim 19, further comprising turning off the processor after configuring the timer configuration register with the first set of register values.

21. The method of claim 19, wherein the interrupt is a last interrupt, the method further comprising:
providing a first interrupt from the timer responsive to completion of the first timer cycle; and
configuring the timer configuration register with a next set of register values of the register values responsive to the first interrupt.

22. The method of claim 21, further comprising receiving the first interrupt at direct memory access circuitry of the microcontroller, wherein configuring the timer configuration register with a next set of register values comprises waking up the direct memory access circuitry.

23. The method of claim 21, wherein configuring the timer configuration register with a next set of register values comprises retrieving the next set of register values from a memory of the microcontroller.

24. The method of claim 19, further comprising:
providing the modulation signal to a modulation circuit; and
providing a modulated signal to an oscillator of the microcontroller that is modulated based on the modulation circuit, wherein the modulation circuit is configured to couple capacitors to a resonant tank of the oscillator responsive to toggling of the modulation signal.

25. The method of claim 24, further comprising driving an antenna to transmit a modulated output signal from the microcontroller, wherein the modulated output signal is based on the modulated signal provided from the oscillator of the microcontroller.

* * * * *